(12) United States Patent
Jacobsen et al.

(10) Patent No.: US 7,266,537 B2
(45) Date of Patent: Sep. 4, 2007

(54) PREDICTIVE SELECTION OF CONTENT TRANSFORMATION IN PREDICTIVE MODELING SYSTEMS

(75) Inventors: Matthew S. Jacobsen, Bellevue, WA (US); Robert J. Jasper, Sammamish, WA (US); Michael M. Meyer, Seattle, WA (US); Kelly A. Pennock, Bothell, WA (US)

(73) Assignee: Intelligent Results, Bellevue, WA (US)

( * ) Notice: Subject to any disclaimer, the term of this patent is extended or adjusted under 35 U.S.C. 154(b) by 505 days.

(21) Appl. No.: 10/757,978

(22) Filed: Jan. 14, 2004

(65) Prior Publication Data

US 2005/0154692 A1 Jul. 14, 2005

(51) Int. Cl.
*G06F 15/18* (2006.01)
(52) U.S. Cl. .......................... 706/62; 700/103; 700/93; 700/108
(58) Field of Classification Search ................. 706/62; 707/4
See application file for complete search history.

(56) References Cited

U.S. PATENT DOCUMENTS

| | | | |
|---|---|---|---|
| 5,937,192 A * | 8/1999 | Martin ....................... 717/145 |
| 6,298,174 B1 | 10/2001 | Lantrip et al. |
| 6,546,379 B1 | 4/2003 | Hong |
| 6,597,775 B2 | 7/2003 | Lawyer |
| 6,772,170 B2 | 8/2004 | Pennock et al. |
| 2003/0236691 A1 | 12/2003 | Casati |
| 2004/0049473 A1 | 3/2004 | Gower |
| 2004/0049478 A1 | 3/2004 | Jasper et al. |

OTHER PUBLICATIONS

Azari et al., Actions, Answers, and Uncertainty: A Decision-Making Perspective on Web-Based Question Answering, Proceedings of the Conference on Uncertainty and Artificial Intelligence, 2003, pp. 11-19.*
Brill et al., Data-Intensive Question Answering, 2001, Microsoft Research.*
ORACLE, 20 OLAP and Data Mining, 1996, 2002, Oracle 9i Data Warehousing Guide Release 2 (9.2).*
Dittrich et al., The Active Database Management System Manifesto: A Rulebase of ADBMS Features, In T. Sellis (ed.): Proc. 2nd Workshop on Rules in Databases (RIDS), Athens, Greece, Sep. 1995. Lecture Notes in Computer Science, Springer 1995.*
Leavitt N., *Data Mining for the Corporate Masses?* Industry Trends, IEEE, Computer, May 2002 (vol. 35, No. 5) p. 22-24.
Galavott L., Sebastiani F., Simi M., *Experiments on the Use of Feature Selection and Negative Evidence in Automated Text Categorization*, Proceedings of ECDL-00, 4th European Conference on Research and Advanced Technology for Digital Libraries, Springer, Verlag, Heidelberg, DE, Lisbon, PT, 2000, pp. 59-68.

(Continued)

*Primary Examiner*—Anthony Knight
*Assistant Examiner*—Nathan H. Brown, Jr.
(74) *Attorney, Agent, or Firm*—Fenwick & West LLP (57) ABSTRACT

A predictive modeling system and methodology makes predictions using unstructured content as an input, either alone or in conjunction with structured content. Content transformation rules are selected for application to the unstructured content, such as emails, call center notes, and other forms of human communication, by identifying the rules that are likely to improve the performance of a predictive modeling system.

52 Claims, 4 Drawing Sheets

OTHER PUBLICATIONS

Apte C.V., Hong S.J., Natarajan R., Pednault E.P.D., Tipu F.A., Weiss S.M., *Data-Intensive Analytics For Predictive Modeling*, IBM J. Res. & Dev. vol. 47 No. 1, Jan. 2003, p. 17-23.

Young Nahm U. and J. Mooney R., Using Information Extraction to Aid the Discovery of Prediction Rules from Text, In Proceedings of the Sixth International Conference on Knowledge Discovery and Data Mining (KDD-2000) Workshop on Text Mining, pp. 51-58, Boston, MA, Aug. 2000.

* cited by examiner

| Token | Record ID |
|---|---|
| ailing | 23, 43, 649, 992,... |
| ... | |
| bankrupt | 51, 99, 172, 453,... |
| ... | |
| illness | 232, 543, 838, .... |
| ... | |
| irate | 189, 385, 695, .... |

| | T1 | T2 | T3 | ... | Tn | Outcome |
|---|---|---|---|---|---|---|
| record #1 | 0 | 1 | 1 | ... | 0 | no |
| record #2 | 1 | 1 | 0 | ... | 1 | yes |
| ... | ... | ... | ... | ... | ... | ... |
| record #n | 1 | 0 | 0 | ... | 0 | yes |

PREDICTIVE SELECTION OF CONTENT TRANSFORMATION IN PREDICTIVE MODELING SYSTEMS

FIELD OF THE INVENTION

The present invention relates to content transformation and preparation of text information in predictive modeling systems, and more particularly to approaches that selectively apply content transformation rules.

BACKGROUND OF THE INVENTION

A preliminary step in almost all data processing systems is preparation of input data for analysis. The type and extent of preparation generally depends on the particular application, but normally includes various content transformation steps, which correct, augment, or transform individual elements of each data record. For example, numerical data may be rounded to a fixed decimal format, dates may be standardized to a particular date format, and percentages expressed as decimals. In information retrieval systems, as another example, where text documents are indexed for searching, it is conventional to perform content transformation rules prior to constructing an index. These steps normally include tokenization, stemming, normalizing case (case folding), aliasing, correcting misspelled words, and expanding contractions. After applying these transformation rules on a document (or set of documents) indexing and other operations can be performed.

The selection of which content transformation rules to apply is generally done heuristically by the system designer based on the particular desired outcome. Typically, transformation rules for unstructured content are applied a) as a group, for example, all selected stemming rules are applied to all content, and b) independent of a specific outcome or measure.

Predictive modeling systems attempt to predict an outcome of some future event based on given set of inputs. Typically, the inputs are various numerical measures of the entities along dimensions that are relevant to the desired outcome. The outcome can be binary, numerical, or represent a class or category. For example, a predictive modeling system may be used to predict a binary outcome of whether loan holders are likely to default on their loans, in which case the inputs are typically such measures as the amount of the loan, interest rate, credit score, number of late payments, and other numerical measures.

In predictive modeling systems that attempt to predict human behavior, the use of structured numerical inputs have tended to dominate. However, recent developments in predictive systems have sought to use unstructured textual information as an input to the predictive system. For example, in predicting potential loan defaults, it may be beneficial to include text based information such as emails received from a loan holders, notes taken from customer service agents who have contacted a loanholder, or messages left by a loanholder on a banks' voice mail system (which can then be converted to text). Each of these sources of textual information may provide information that can improve the effectiveness of the predictive model. Another example of predictive modeling would be classification of a customer's potential profitability based on not merely their purchase history, but on textual information from conversations extracted from emails, letters, telephone conversations, and the like.

When applying textual information as an input to a predictive modeling system, it is necessary to prepare the text by applying standard data preparation and content transformation rules, such as those mentioned above. For example, the raw text of customer emails is first tokenized into individual word units called tokens. After tokenization, the tokens may be corrected for spelling, stemmed, and normalized via a thesaurus. Once transformed, the transformed tokens from each customer email would be represented as an input to the predictive model, using any variety of indexing, vectorization, or other representation schemes.

The problem with this approach is that the choice of which content transformation rules to apply (and their order of application) is conventionally made without regard to their potential impact on the effectiveness of the predictive model. However, predictive modeling systems are often sensitive to subtle variations in the input data, and thus the application of a set of content transformation rules may itself influence the effectiveness of the model. Conventional approaches that assume that particular content transformation rules (e.g., stemming) are always appropriate thus fail to recognize the impact of such rules on the quality of the predictive model. In particular, arbitrary application of content transformation rules may result in a loss of predictive power by masking information that is predicatively relevant.

Accordingly, it is desirable to selectively determine which content transformation rules to apply to input data in predictive modeling systems based on the rules' likelihood of improving the predictive model on new data.

SUMMARY OF THE INVENTION

The present invention provides a methodology and system for selecting content transformation rules to be applied to input data for a predictive modeling system by selecting which rules are most likely to improve the predictive accuracy of the model. Generally, a set of candidate content transformation rules is provided. A group of the records, such as a training set, is selected, where the outcome (dependent variable) is known. A set of content transformation rules is analyzed on tokens in the training set. Statistics measuring the potential impact on the model are computed for each transformation rule to identify which transformations are most likely to improve the predictive power of the model. Any number of different statistical tests may be applied to rank the candidate transformation rules depending on the desired outcome. Those transformations that are most likely to improve model accuracy are selected, and can be applied to new, unstructured content. The present invention further enables identifying classes of transformation rules or sequences of transformation rules that improve the accuracy of the predictive model as well.

In one embodiment, the candidate transformation rules are analyzed by applying each rule to a set of source tokens. The source tokens are derived from structured content associated with the records. A transformation rule generally produces a token in response to a given source token. Each produced token can be associated with one or more of the records for which the predicted outcomes is known. The statistical measures are then applied to the training set of records, to determine which of the produced tokens is statistically likely to increase the accuracy of the predictive model.

The transformation rules that can be analyzed in this way comprise any type of transformation rule, including any type of semantic, syntactic, grammatical, or morphological rule.

Example includes tokenization, stemming, case folding, aliasing, spelling, phrase generation, feature generation, and translation rule.

The statistical measures that can be applied generally depend on the type of predicted outcome (e.g., whether is Boolean, categorical, numerical, etc.). Generally though, the statistical analysis includes determining a number or distribution of correct and incorrect outcomes from the records associated with a produced token. The particular measure used will variously determine the impact on the predictive models accuracy from these values. One approach is to identify the produced token or tokens, and associated transformation rule or rules, that maximizes the number or distribution of correct outcomes is selected. Another statistical measure identifies the rules that maximize information gain. Another measure identifies the rules that maximize and Odds ratio for correct outcomes. Another measure analyses residuals between predicted and actual outcomes for the tokens.

The selection of transformation rules based on improvement in predictive accuracy can be extended to groupings or classes of transformation rules, such as all aliasing rules, all stemming rules, and so forth (or other more specific or more general), as well as to sequences of transformation rules.

The source tokens are preferably derived by indexing a collection of structured content associated with the records. The indexing process applies a set of tokenization rules to the structured content to generate the source tokens. Another feature of the invention then is to use the results of the foregoing analysis to select the tokenization rules that are applied in the indexing process to generate the source tokens themselves.

The present invention may be embodied in various forms. In one embodiment, the present invention comprises a system of various hardware and related software components, as follows. A database stores structured content records, each content record including a predicted outcome. An index of source tokens is derived from some collection of unstructured content, and each source token associated with structured content records in the database. A database of transformation rules is provided, where each rule produces a token in response to a source token. A predictive model generates the predicted outcome for a structured content record, which outcome can be compared with known outcomes for some of the records. A rules selection process applies selected ones of the transformation rules to the index to produce tokens from the source tokens. The selection process then identifies those transformation rules likely to improve the accuracy of the predictive model.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
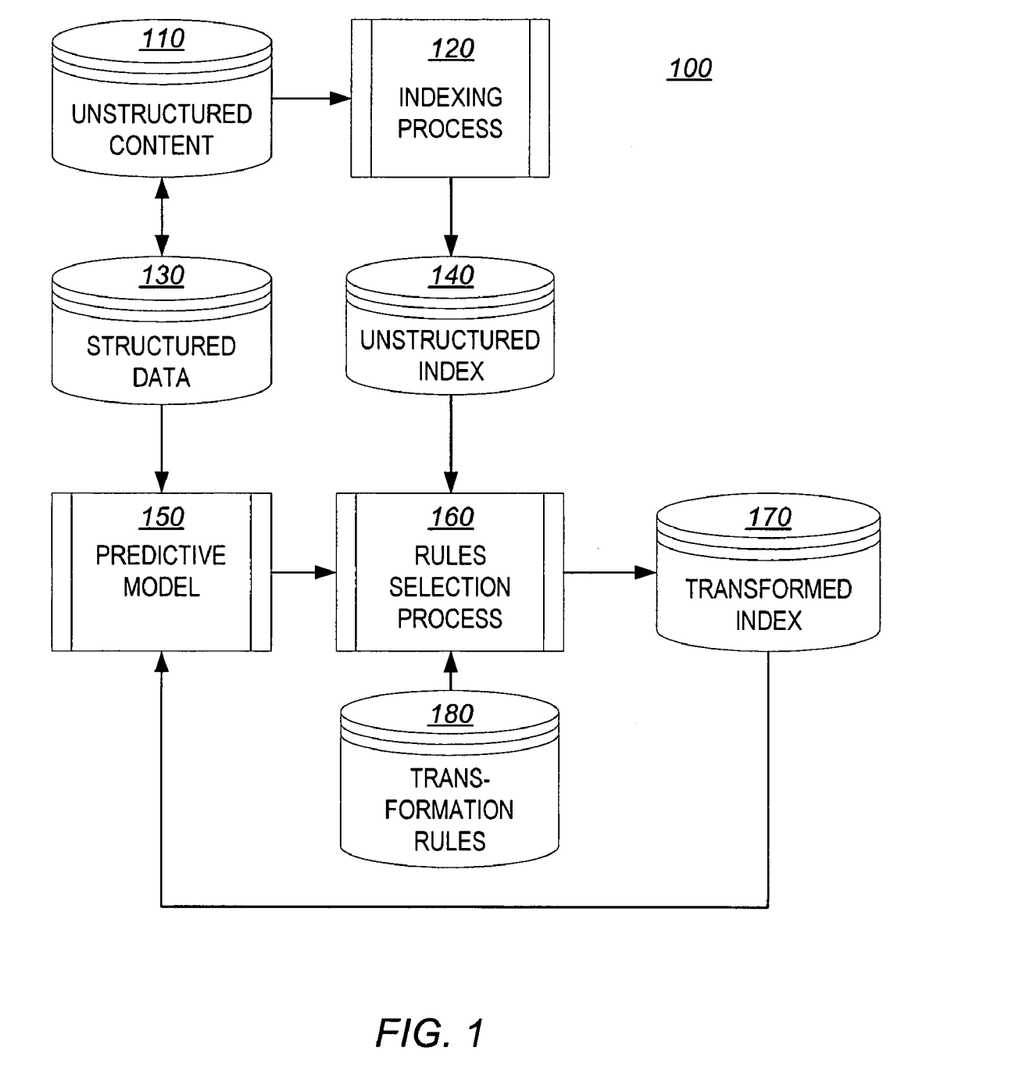
FIG. 1 is block diagram of the software architecture of one embodiment of the present invention.

Referring now to FIG. 1, there is shown the software architecture of an embodiment of a predictive modeling system 100 in accordance with one embodiment of present invention. Generally, the predictive modeling system 100 may be used for any type of predictive modeling problem in which content transformation rules are to be applied to some set of unstructured text content prior to input to the predictive model. One preferred embodiment of such a predictive modeling system 100 is a system for predicting financial behavior of persons, based on inputs of financial information and textual information, and the present invention will be thus explained in this example embodiment for ease of understanding. However, those of skill in the art will appreciate that the present invention is not limited to prediction or classification of user behavior or financial performance, but may be applied to numerous application domains. Similarly, it will be appreciated that while the preferred embodiment selectively determines the content transformation rules to be applied to the textual information, the principles of the present invention can be extended to structured numeric data or other data types. Those of skill in the art further appreciate that the system of FIG. 1 can be embodied in any suitable programming language, and provided as a computer program product on a computer readable medium.

Referring to FIG. 1 then, the system 100 includes a database 130 of structured data, a database 110 of unstructured content, an index 140 of the unstructured content, a database 180 of content transformation rules, a predictive model 150, a rules selection process 160, and an indexing process 120. By way of overview, the rules selection process 160 selects content transformation rules from the database 180 that are likely to improve the accuracy of the predictive model 150.

The structured content database 130 comprises structured records, such as customer records, accounts, and the like. Each record contains various fields of data appropriate to the application domain, and in the present example of a financial predictive modeling system, would include relevant financial information for each customer, along with demographic or other types of data useful for the predictive model 150. Each record also includes one or more fields used to store the actual outcome the model will be trying to predict. For example, a predictive modeling system for predicting risk of credit default may include a binary flag for storing whether the customer defaulted. Each record includes a record ID or other information that can be used as a primary key for associating the record with other information, such as customer account number.

Associated with the structured data 130 is the repository 110 of unstructured text content. The unstructured content 110 is preferably any type of human or natural language content, represented in text form used to increase the predictive abilities of the model. This includes, for example, emails, transcribed telephone messages, notes from customer service agents, form submissions from a web site, responses to survey questions, online chat, and so forth. Given the vast variety in which human communications arise and are recorded, the present invention is not limited to any specific form for capturing such communications as unstructured content or any particular source.

The unstructured text content may be received into the system 100 in many forms, sometimes packaged as individual records, other times in a single file with explicit or implicit delimiters. As needed then, an initial processing step can include parsing the unstructured content into separate records.

Each unstructured text content item is logically associated with a particular customer record in the structured data database 130, and multiple unstructured items may be associated with a particular customer record. For example, if the unstructured content is in the form of customer emails and saved to a file containing only email contacts, then the customer identifier for the email (i.e. email address) is matched with the corresponding structured and outcome variables (e.g., customer account number, balance, payment history) for that same customer. Though illustrated as a logically separate database, the unstructured content repository 110 may be incorporated into the structured database 130, as appropriate for the particular implementation requirements of a given system; thus the particular database implementation and record structured is not limited by the present invention.

Figure 2:
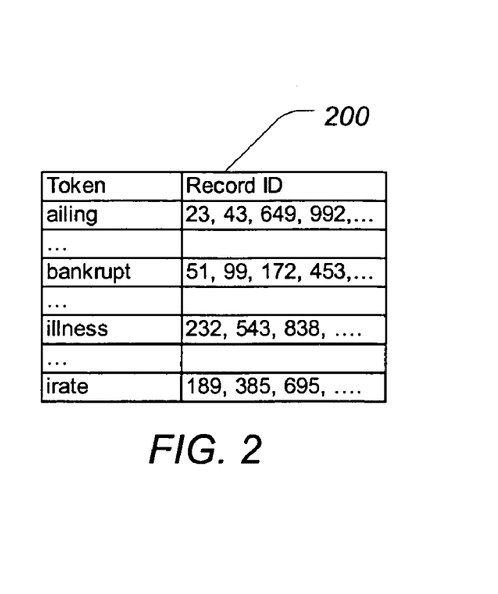
FIG. 2 is an illustration of an inverted index.

The indexing process 120 (or 'indexer') is used to index the unstructured content 110 to form an unstructured content index 140. The unstructured content index 140 performs an initial parsing of the unstructured content 110 into a set of original or source tokens, based on simple tokenization rules, such as individual words as separated by white spaces. A subsequent re-parsing of the content 110 may be applied, based on the analysis of the selected transformation rules. Each unique source token is then associated with one or more of the structured data records in which it appears. The logical association of source token to data record is maintained in the unstructured index 140, for example, as an inverted index, or as a feature map. FIG. 2 illustrates portion of an inverted index 200. The inverted index 200 stores each unique source token in association with a list of record IDs of the structured data records in which the source token occurred. For example, each unique token appearing in a collection of customer emails, would be associated with a list of record IDs of the respective customers who sent the email containing the token.

Figure 3:
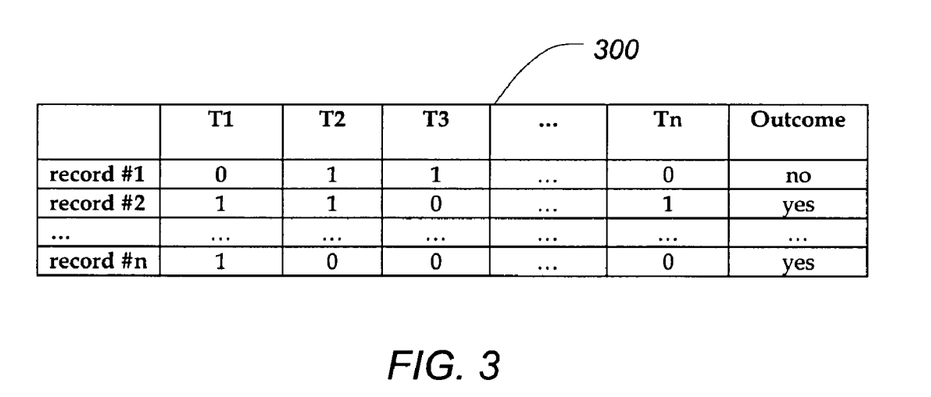
FIG. 3 is an illustration of a feature map.

FIG. 3 illustrates a feature map form for the unstructured index 140. The feature map index 300 stores for each record ID the count (or presence) of each unique token T in the unstructured text for that record. In the example of FIG. 3, a "1" indicates the presence of the token T in the unstructured record associated with the record ID, and a "0" indicates the absence. In this way, the unstructured content is processed to produce quantifiable features (a feature vector) and allow the use of such information in the predictive model 150. The feature map 300 is similar to document vectors used in information retrieval systems, but with an associated outcome (stored with the structured data).

Both of the above implementations are suitable for the present invention, and the selection depends on the particular implementation requirements. Those of skill in the art will likewise appreciate that other types of structures can be used for unstructured index 140.

A set of candidate transformation rules is defined and stored in a data repository, such as rules database 180. Transformation rules for unstructured content describe the generation, merging, replacement or rewriting of a token or set of tokens. More specifically, each transformation rule defines an input token to be matched for firing the rule, and a corresponding output token (or tokens) to be produced. The input token can be defined by a literal or by a regular expression, or other pattern matching formats. The firing of a transformation rule may result in a transformed token or tokens or may leave the input token unchanged.

The transformation rules 180 can be logically organized into classes, which may be hierarchically arranged. The following classes are illustrative:

Tokenization transformations: these rules extract individual tokens from character strings by selecting token boundaries, such as white space characters and punctuation characters such as '-', ',' ';' and so forth.

Stemming transformations: these rules modify or remove prefixes and suffixes of tokens. Examples include removal of suffixes such as "ing," "ly", "ment", "ation", and removal of prefixes such as "pre", "un", "en" and so forth.

Case folding transformations: these rules modify the capitalization of the tokens, such as changing from all capitals (e.g. "IRATE") to lower case ("irate").

Aliasing transformations: these rules replace a token with its alias, using a thesaurus or other synonym source. For example, detection of 'joyous' results in the production of the token 'happy'.

Spelling correction transformations: these rules correct spelling; for example, 'hapy'→'happy'

Phrase generation transformations: these rules take a single token and context containing the neighboring tokens to construct a token for a phrase. For example, the token 'filing' might often be found next to the token 'bankruptcy'. Where juxtaposed the individual tokens 'filing' and 'bankruptcy' would be merged into a single token 'filing bankruptcy'.

Feature generalization transformations: these rules substitute a more general feature class for a specific instance. For example, a token of the format "$#.##" produces the token "money". Feature generalization can be extended to include dates, time, places, and so forth. The generalization may also be used for quantization, to output a token for any numeric value in a define range, or for rounding up a dollar amount to the nearest ten dollars.

Translation transformations: these rules translation a token from a source language to a target language (e.g., English to French); this is a variation of the aliasing transformation.

The predictive model 150 is an implementation of a supervised machine learning algorithm. By way of background, supervised learning uses a set of representative or training examples, along with an outcome variable corresponding to each example, for the purposes of predicting the value of the outcome on unseen instances. A particular instance of a supervised learning algorithm constructed with a set of training examples constitutes a model for the purposes of this discussion. The outcome variables are values that are predicted, and can be binary, numeric or categorical. For example, given a number of training records containing number of days a payment is late, account balance, last day contacted, and a binary outcome indicating whether a customer defaulted on a loan, supervised learning can be used to predict whether other customers will default on a loan given the specific account information. There are several metrics measuring the effectiveness of the predictive model 150 for such problems—one such metric for binary outcomes measures the ratio of correct predictions to incorrect predictions. In this case, greater ratios indicate higher accuracy.

In the context of using unstructured content 110 as an input to the predictive model 150, the unstructured content 110 is processed to produce features that can be learned by the model as predictive of the outcome variable. In the example embodiment of FIG. 1, the predictive model 150 is used to predict the likelihood of a loan default by a consumer, using the unstructured content 110 records associated with a consumer as an input. The model 150 would learn which tokens (or features) in the unstructured content were predictive of default, such as "bankruptcy," "death," "illness", along with each token's associated weight or importance by using a set of training records in a supervised learning algorithm.

Figure 4:
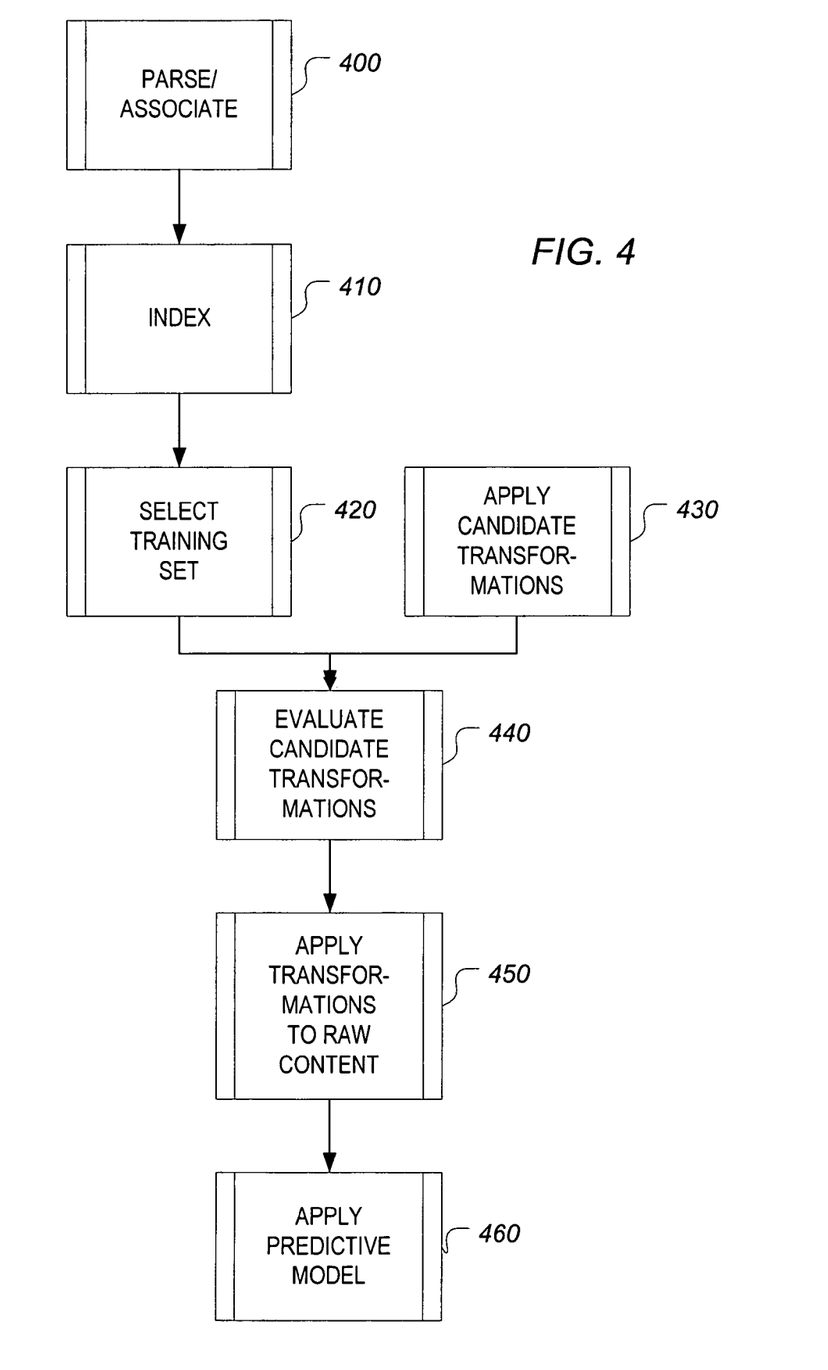
FIG. 4 is a flowchart of the methodology of the present invention.

Referring to FIG. 4 there is shown a flowchart of the methodology of the present invention. The methodology is presented in a particular sequence of operations, but those of skill in the art will appreciate than the specific implementation and order of the operations may vary.

Initially, the unstructured content data is parsed 400 into separate records and stored in unstructured content database 110, and then associated with corresponding records in the structured content database 130. The identification of individual records in the unstructured content will depend on the type of unstructured content (e.g., emails, text submissions, call center notes, and so forth), and the system or environment from which they are received. Similarly, the association with the content records in database 130 will depend on the both of the record types. For example, where the unstructured content are emails, then the association with the structured content records would be matching the email address of the sender to email addresses stored in the structured data 130. The present invention does not limit the mechanism or process by which unstructured records are associated with the structured records.

The unstructured content 110 is then tokenized and indexed 410 by the indexing process 120. This step creates the unstructured index 140. As noted above, the index 140 will map or relate each unique token identified in the unstructured records, with each unstructured record in which it appears (or the corresponding structured record associated with the unstructured record). For example, each instance of the word "bankrupt" appearing in customer communication will be indexed to the records of the corresponding customers in the structured database 130.

A set of the unstructured records 130 is then selected 420 as a training set for evaluation of potential content transformation rules. The selection mechanism is dependent on the nature and quantity of the available data and not limited by the present invention. While it is preferred to use a limited subset for training purposes, in some cases, the entire collection of unstructured data may be used for training, if deemed appropriate for the application. These selected records are then scored by the predictive model 150 to obtain a predicted value for the outcome variable. The predictive model 150 operates in this mode using either the structured or unstructured portions of the records as appropriate for the model design.

Separately, a set of transformation rules is selected and applied 430 to the unstructured content index 140. The selection may be of particular content transformation rules, such as all stemming rules, or all aliasing rules, or may be the entire set of available content transformation rules.

Figure 5:
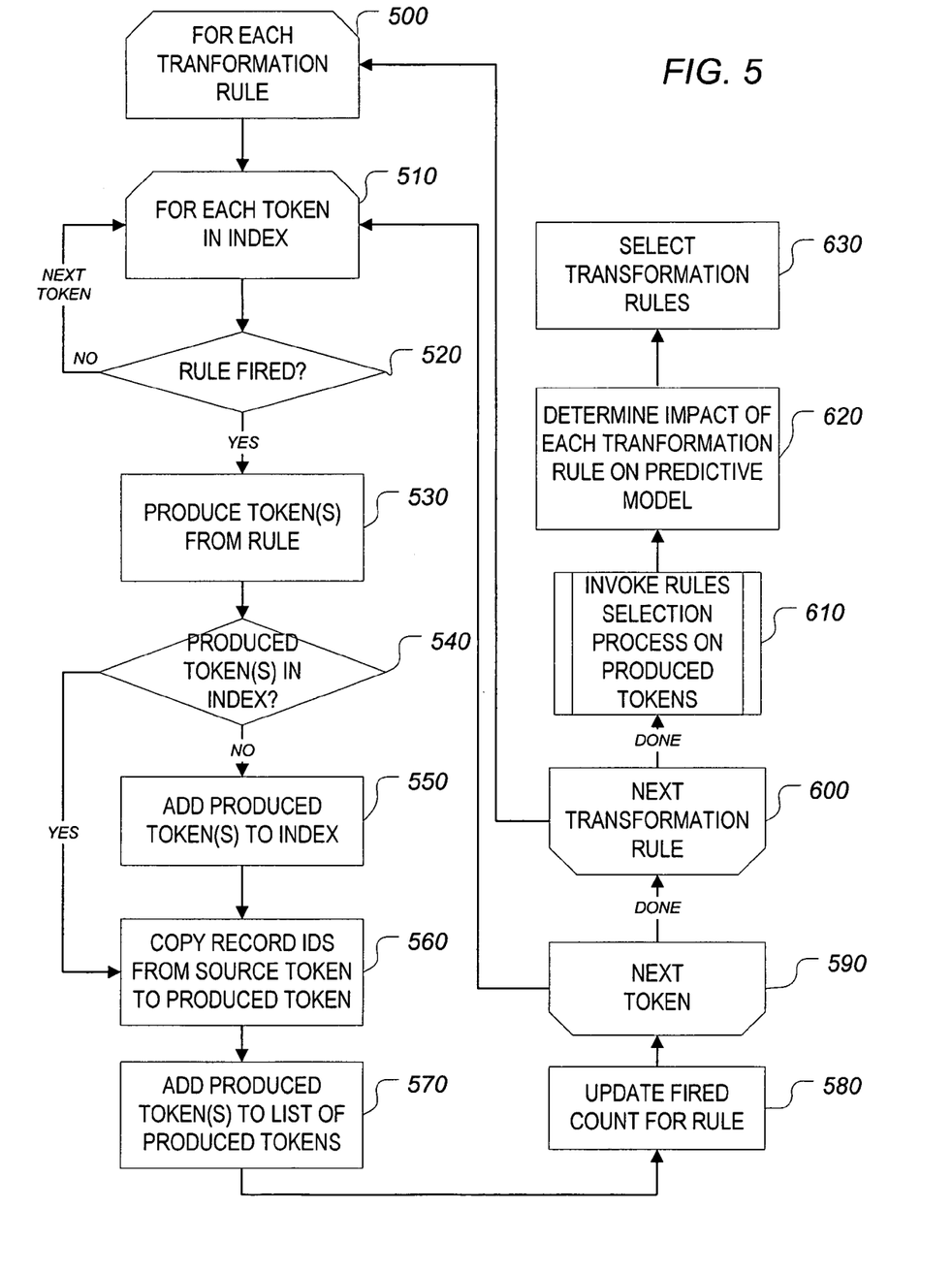
FIG. 5 is a flowchart of the logic of the rules selection process.

The selected content transformation rules are analyzed 440 by the rules selection process 160 to determine which rules are likely to improve the accuracy of the predictive model 150. FIG. 5 illustrates the logic for one implementation of the rules selection process 160. For each content transformation rule (500), the rules selection process 160 iterates 510 through the index 140 and identifies 520 each token that is relevant to the transformation rule, that is, which causes the rule to fire. Rules will not fire if they do not result in a change to the source token. If the rule fires 520 on a token resulting in a modified token or tokens, then index 140 is updated with results of the transformation rule. The result of the rule firing will generally produce 530 one or more tokens. The rules selection process 160 also adds 570 the produced token to a list of produced tokens, along with identifiers to the source token that triggered the transformation rule, and the transformation rule itself.

When a transformation rule is fired, the rules selection process 160 determines 540 whether each produced token already exists in the index 140. If a produced token already exists, then the list of records IDs associated with the source token which fired the rule is added 560 to the list of associated record IDs already associated with the produced token. If the produced token does not currently exist in the index 140, then the rules selection process 160 creates 550 a new entry in the index 140 for the produced token, and again copies 560 the list of record IDs associated with the source token to the new entry for the produced token.

Two examples will help further explain this process. Assume first that the current transformation rule is a stemming rule, such as a "remove'-ly'". Assume further that the token "quickly" is present in the index 140 and associated with record IDs {234, 456, 789, 1011}. The rules selection process 160 traverses through the index 140 and tests each token therein to determine if the rule applies to the token. When a token ending in 'ly' is encountered, such as "quickly", then the rule is fired, and produces a token "quick". The rules selection process 160 determines whether the token "quick" is already present in the database. If it is, then the rules selection process 160 copies the record IDs associated with "quickly", {234, 456, 789, 1011}, to the list of record IDs already associated with "quick." If "quick" is not in the index, then a new entry is created for it, and the record IDs are again copied (or otherwise logically related) to the new entry for "quick." The rules selection process 160 also updates the list of produced tokens to include "quick" along with a reference to "quickly" as the source token.

Similarly, assume that the current transformation rule is an aliasing rule, such as the token "angry" produces the token "irate". Again, when the rules selection process 160 reaches the token "angry" in the index 140, this transformation rule will fire to produce the token "irate." The rules selection process 160 determines whether "irate" is already present in the index, and if so, copies the record IDs associated with "angry" to the list of IDs associated with "irate," or instantiates a new entry for "irate" and copies the record IDs there. The rules selection process 160 updates its list of produced tokens to include "irate" with a reference to "angry" as the source token.

The list of produced tokens can be maintained separately, or by marking the token entries in the index 140 as being source or produced (or both, as the case may be). Each produced token also includes a reference to the transformation rule that produced the token.

The rules selection process 160 also maintains 580 a counter for each candidate transformation rule and increments the counter each time the rule is fired. This information is useful to evaluate the most frequently used rules, and measure or scale a rule's frequency of use relative to its effective on the accuracy of the predictive model 150.

As an optional step, after a first pass of the index 140, the rules selection process 160 can evaluate 610 each transformation rule against each of the produced tokens on the list of produced tokens (excepting those that were source tokens), producing a further set of tokens. This iterative process is terminated after a limited number of passes (e.g., three).

Those of skill in the art will appreciate that the particular order of the above steps can be varied, for example by swapping the inner loop and outer loops so as to evaluate each token in the index against each transformation rule. The choice of which the particular sequence of operations is not material to the invention.

Once the selected transformation rules are processed, the rules selection process 160 determines 620 the potential impact of each transformation rule on the predictive model 150. As noted above, for each record in the training set, the actual value of the dependent variable to be predicted is known. Additionally, for any produced token, the rules selection process 160 can determine from the list of produced tokens which transformation rule produced the token. Generally then, the rules selection process 160 determines the potential impact of a transformation rule on the accuracy of the predictive model 150. This is preferably done by using statistical measures that compare the number or distribution of correct and incorrect predictions that would be made using the token produced by the transformation rule with the predictions made using the source token from which the transformation rule produced the produced token. The statistics are obtained from the structured records respectively associated with the produced token (step 560 above) for a transformation rule, and the source token in the index 140.

The specific type of statistic used, in part, will depend upon whether the output being predicted is binary, continuous, or categorical. In one embodiment for a binary outcome, whichever transformation maximizes the measure (e.g., higher percentage of correct predictions), indicates which transformation rule should be applied. Evaluation of binary outcomes can be made using various statistical measures of distributions, such as Chi squared, Information gain, or Odds ratio. However, those of skill in the art will appreciate that the present invention is not limited these particular measures; other measures, for example correlation, can be used to rank rules where a continuous outcome is being predicted. Each of these measures is discussed in further detail below.

In one embodiment, this determination is performed as follows. Generally, the transformations are measured based on the distribution of documents containing source tokens and those tokens produced through transformation rules. For each source token and its associated produced tokens, the rules selection process 160 accesses the list of record IDs that have been associated with each token. From these records, a 2×2 matrix of record counts can be constructed for each token, using the actual value of a binary outcome variable:

|  | with token | without token |
|---|---|---|
| positive outcome | tp | fn |
| negative outcome | fp | tn | where:
tp = number of true positives
fp = number of false positives
tn = number of true negatives
fn = number of false negatives.

As an example, viewing each token (or produced token) as a predictor, true positives (tp) represents the count of structured records with a positive outcome that are associated with the token and true negatives (tn) represents the count of structured records with a negative outcome that are not associated with the token. Thus, "true" in true positives reflects the fact that the prediction by the predictive model 150 was correct; correspondingly, "false" indicates the prediction was incorrect. This data provides a means of ranking the candidate tokens (and corresponding transforms) by measuring the relation between correct and incorrect predictions.

For convenience, several derived aggregate variables are also computed:

| Definition | Description |
|---|---|
| pos = tp + fn | number of correct predictions |
| neg = fp + tn | number of incorrect prediction |
| $P_{feaure} = (tp + fp)/(tp + fp + tn + fn)$ | percentage with token PT |
| $P_{-feaure} = 1 - P_{feaure}$ | percentage without PT |
| $P_{pos} = pos/(pos + neg)$ | percentage correct predictions |
| $P_{neg} = neg/(pos + neg)$ | percentage incorrect predictions |

If a transformation rule produces multiple tokens, then the data associated with the records for these multiple tokens can be aggregated. From these various measures, different statistical tests can be applied to determine which candidate transformation rule (or potentially no transformation rule) is likely to improve performance of the predictive model 150. These measures are now discussed.

Information gain measures the decrease in entropy based on the presence versus absence of a token (i.e., feature) and is given by the following equation:

$$InformationGain_{feature} = \text{entropy}(pos, neg) - [\text{entropy}(tp, fp)P_{feature} + \text{entropy}(fn, tn)P_{-feature}]$$

where:

$$\text{entropy}(x, y) = -\frac{x}{x+y}\log_2\frac{x}{x+y} - \frac{y}{x+y}\log_2\frac{y}{x+y}$$

Chi squared measures the divergence from a distribution in which the feature is independent of the outcome and is given by the equation:

$$X_{feature}^2 = c(tp,(tp+fp)P_{pos}) + c(fn,(fn+tn)P_{pos}) + c(fp,(tp+fp)P_{neg}) + c(tn,(fn+tn)P_{neg})$$

where:

$c(\text{actual}, \text{expected}) = (\text{actual} - \text{expected})^2/\text{expected}$ Here, the condition with the higher Chi squared value indicates the more effective impact on the predictive model 150.

Odds ratio measures the odds of the feature (i.e., PT) occurring in the correct predictions normalized by that of the incorrect predictions and is given by the equation:

$$oddsRatio_{feature} = \frac{tp \; tn}{fp \; fn}$$

An Odds ratio result significantly different from 1 suggests that the associated transformation rule is likely to improve predictive accuracy of the model 150.

Using one or more of the above statistical tests, rules selection process 160 determines for each token which transformation rule maximizes the measure being used. Each of these statistics attempts to identify the discriminatory power of a candidate token transformation by measuring differences in the distribution of positives and negatives in the presence or absence of the feature, here the produced token. A difference in the number or distribution of correct and incorrect predictions indicates that the candidate transformation rule is likely to change the accuracy of the predictive model. Based on this information, a candidate rule can be selected for future use where it likely improves the accuracy of the predictive model.

In one embodiment, the transformation rule for each token that maximizes the statistical measure are assumed to improve the accuracy of the predictive model 150. Thus, even this information may be used to avoid application of transformation rules that may degrade model accuracy. Alternatively, an appropriate threshold can be set for a given statistical measure, and those transformation rules which cause a change in the measure in excess of the threshold are identified.

The foregoing statistical analysis of the impact of a transformation rule can be scaled up to any desired level of aggregation with respect to the classes or groupings of the transformation rules, or with respect to particular tokens. Thus, in its basic form, as just described, the analysis is done for each rule individually, for example for each "-ly" removal rule by itself, each aliasing rule by itself, and so forth. A first order of aggregation is used for all rules of a given subclass, such as all "-ly" removal rules together, all "-ment" removal rules, and so forth, to determine the impact of the subclass on the predictive model 150. A next order of aggregation is used for all rules of a given class, such as all suffix stemming rules, or all stemming rules together, and so forth. At each of these levels, the predicted and actual outcome data is aggregated with respect to the produced tokens and the source tokens from the records associated with these tokens. The frequency of rule firings can also be used, both for individual rules and in aggregate for classes of rules, to further scale or otherwise adjust the results of the above statistical measures.

One variation of the present invention is to define a transformation sequence as particular sequence for applying a given set of transformation rules. For example, a transformation sequence may define the following transformations in order:

"IRATELY"→"irately";
"irately"→"irate";
"irate"→"angry", which would be different from the same transformations in a different order, such as:

"IRATELY"→"IRATE";
"IRATE"→"irate";
"irate"→"angry".

Each transformation sequence can then be separately tracked when applied to the unstructured content index 140, so it is known which sequences have been invoked, which information can then be used by the rules selection process 160 when tabulating the predicted and actual outcomes for analysis of the transformation rules.

A related variation is separately track the statistics for each stage of a multiple operation transformation, such as "IRATELY"→"irately"→"irate". Here, the prediction statistics are accumulated separately for both the first and second transformation, and the entire transformation as a unity. A multiway comparison of these candidate transformations with the prediction data for the source token indicates the relative effectiveness of each stage of transformation.

It is also possible for the effects of transformation rules to interact. A given transformation rule such as "irately"→"irate" may not be chosen when reviewed in isolation, but may be chosen if other transformations have already been applied, such as "mad"→"irate". This interaction is caused changes to the distribution of documents containing the produced target token by multiple transformation rules. A related variation is to identify those combinations of transformation rules that when taken together collectively maximum the measure being used.

Additional transformations can also be done on the final token-based features based on outcome. Such transformations include but are not limited to mathematical transforms on the token counts (e.g., square root, logarithms) and vector creation methods using outcome as a means of ranking and selecting the transforms most likely to improve predictive quality.

Another methodology for predictive selection of the transformation rule uses a residuals analysis approach. Here, an initial predictive model 150 is applied to a set of records to generate predicted outcomes. A set of transformation rules is then applied to the records to process the unstructured content. The residuals are the difference, or error, between the predicted outcomes and actual outcomes. The association between the residuals and the counts for each transformed token are measured to assess each token's ability to account for error. Various measures (e.g., correlation) can be used to measure this association. Those transform having the highest association with the residuals are then chosen. A significant association result means that the transformation rules will likely reduce the error in the initial predictive model 150.

As a further optional step, following the selection of a set of transformation rules, the unstructured content may be re-indexed 410 by the indexing process 120, based on the selected transformation rules. This re-parsing operation allows for testing and selection of even the most basic of initial parsing rules, such as whether to break words are particular punctuation marks, and other low level operations.

Once some set of transformation rules is selected then, the remaining structured records in the database 130 can be processed using the selected rules, and their relevant outcomes predicted. Likewise, the selected content transformation rules can be applied to new, incoming structured content records and associated unstructured content.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for selecting transformation rules for application to unstructured text content in customer accounts, comprising:
    storing a plurality of customer accounts, each customer account comprising:
        a structure content record of financial and personal information associated with a customer;
        unstructured text content derived from an interaction with the customer; and
        an actual outcome of an event related to the customer;
    providing a set of source tokens from the unstructured text content of the customer accounts, each source token associated with at least one of the structured content records;
    applying candidate transformation rules to a set of source tokens to selectively produce tokens in response to the transformation rules;
    determining for each candidate transformation rule a statistical measure of accuracy of a predictive model for predicting outcomes of events related to the customers based on the actual outcomes of events in the customer accounts associated with the produced tokens; and
    selecting transformation rules that improve the measure of accuracy of the predictive model.

2. The method of claim 1, further comprising:
    associating each token produced by a transformation rule from a source token with structured content records associated with a source token.

3. The method of claim 1, wherein determining for each candidate transformation rule a statistical measure of accuracy comprises:
    determining a number of correct and incorrect predicted outcomes from the structured content records associated with a token produced by the transformation rule.

4. The method of claim 1, wherein determining for each candidate transformation rule a statistical measure of accuracy comprises:
    determining a distribution of correct and incorrect predicted outcomes from the structured content records associated with a token produced by the transformation rule.

5. The method of claim 1, wherein selecting transformation rules that improve the measure of accuracy of the predictive model comprises:
    selecting transformation rules that maximize the measure of accuracy of the predictive model.

6. The method of claim 1, wherein determining for a candidate transformation rule a statistical measure of accuracy of the predictive model comprises:
    determining a number of correct predicted outcomes from the structured content records associated with a token produced by the transformation rule;
    determining a number of correct predicted outcomes from the structured content records not associated with the produced token;
    determining a number of incorrect predicted outcomes from the structured content records associated with a token produced by the transformation rule; and determining a number of incorrect predicted outcomes from the structured content records not associated with the produced token.

7. The method of claim 1, wherein determining for each candidate transformation rule a statistical measure of accuracy of the predictive model comprises:
   determining an information gain resulting from transformation rule.

8. The method of claim 1, wherein determining for each candidate transformation rule a statistical measure of accuracy of the predictive model comprises:
   determining an Odds ratio for correct predicted outcomes in structured content records associated with a token produced by the transformation rule.

9. The method of claim 1, wherein determining for each candidate transformation rule a statistical measure of accuracy of the predictive model comprises:
   determining a Chi-square value for the distribution of predicted outcomes for structured content records associated with a token produced by the transformation rule, relative to a distribution of predicted outcomes of structured content records without the produced token.

10. The method of claim 1, further comprising:
    determining a statistical measure of accuracy of the predictive model for a class of candidate transformation rules; and
    selecting a class of transformation rules according to the statistical measure of accuracy.

11. The method of claim 1, further comprising:
    determining a statistical measure of accuracy of the predictive model for a sequence of candidate transformation rules; and
    selecting a sequence of transformation rules according to the statistical measure of accuracy.

12. The method of claim 1, further comprising:
    determining a statistical measure of accuracy of the predictive model for each candidate transformation rules in a sequence of candidate transformations rules; and
    selecting a transformation rule from the sequence according to the statistical measure of accuracy.

13. The method of claim 1, wherein determining for each candidate transformation rule a statistical measure of accuracy of the predictive model comprises:
    determining residuals between the predicted outcomes and actual outcomes for the structured content records associated with tokens produced by the candidate transformation rule.

14. The method of claim 1, wherein the transformation rules are selected from the group consisting of:
    tokenization rules;
    stemming rules;
    case folding rules;
    aliasing rules;
    spelling correction rules;
    phrase generation rules;
    feature generalization rules; and
    translation rules.

15. The method of claim 1, wherein the predictive model is a supervised learning algorithm.

16. The method of claim 1, wherein providing a set of source tokens from the unstructured text content of the customer accounts comprises:
    parsing the unstructured text content using an initial set of transformation rules to produce the set of source tokens; and
    subsequent to the selection of transformation rules, re-parsing the unstructured text content to produce a revised set of source tokens.

17. The method of claim 1, wherein applying candidate transformation rules to a set of source tokens to selectively produce tokens in response to the transformation rules, comprises:
    applying a candidate transformation rule to a source token to produce a token;
    associating the produced token with the source token;
    associating the produced token with the structured content records associated with the source token.

18. A method for selecting transformation rules for application to unstructured text content in customer accounts, comprising:
    providing a plurality of customer accounts, each customer account comprising:
        a structure content record of financial and personal information associated with a customer;
        unstructured text content derived from an interaction with the customer; and
        a predicted outcome from a predictive model, wherein the predictive model predicts outcomes of events in customer accounts
    providing an index of source tokens from the unstructured text content, each source token associated with at least one of the structured content records;
    applying candidate transformation rules to the source tokens to selectively produce tokens in response to the transformation rules,
    associating each token produced by a transformation rule with the structured content records associated with a source token;
    determining for each transformation rule a statistical measure of the accuracy of the predicted outcomes from the structured content records associated with the tokens produced by the transformation rule; and
    selecting transformation rules that improve the statistical measure of accuracy of the predicted model.

19. A computer implemented software system for selection of content transformation rules for application to unstructured text content in customer accounts, the system comprising:
    a database of customer accounts, each customer account comprising
        a structure content record of financial and personal information associated with a customer;
        unstructured text content derived from an interaction with the customer; and
        a predicted outcome of an event related to the customer;
    an index of source tokens derived from the unstructured text content of the customer accounts, each source token associated with at least one of the structured content records;
    a database of content transformation rules, each transformation rule adapted to produce a token in response to a source token;
    a predictive model, adapted to generate the predicted outcomes of events related to the customers using the structured content records and tokens derived from the unstructured text content using the content transformation rules; and
    a rules selection process, adapted to apply selected transformation rules to the index to produce tokens from the source tokens, and identify transformation rules that improve the accuracy of the predictive model.

20. The system of claim 19, wherein the rules selection process associates each token produced by a transformation rule from a source token with structured content records associated with a source token.

21. The system of claim 19, wherein the rules selection process identifies transformation rules that improve the accuracy of the predictive model by determining for each transformation rule a number of correct and incorrect predicted outcomes from the structured content records associated with a token produced by the transformation rule.

22. The system of claim 19, wherein the rules selection process identifies transformation rules that improve the accuracy of the predictive model by determining for each transformation rule a distribution of correct and incorrect predicted outcomes from the structured content records associated with a token produced by the transformation rule.

23. The system of claim 19, wherein the rules selection process identifies transformation rules that improve the accuracy of the predictive model by selecting transformation rules that maximize a statistical measure of accuracy of the predictive model.

24. The system of claim 19, wherein the rules selection process identifies transformation rules that improve the accuracy of the predictive model by determining for each transformation rule:
    a number of correct predicted outcomes from the structured content records associated with a token produced by the transformation rule;
    a number of correct predicted outcomes from the structured content records not associated with the produced token;
    a number of incorrect predicted outcomes from the structured content records associated with a token produced by the transformation rule; and
    a number of incorrect predicted outcomes from the structured content records not associated with the produced token.

25. The system of claim 19, wherein the rules selection process identifies transformation rules that improve the accuracy of the predictive model by determining for each transformation rule an information gain resulting from transformation rule.

26. The system of claim 19, wherein the rules selection process identifies transformation rules that improve the accuracy of the predictive model by determining for each transformation rule an Odds ratio for correct predicted outcomes in structured content records associated with a token produced by the transformation rule.

27. The system of claim 19, wherein the rules selection process identifies transformation rules that improve the accuracy of the predictive model by determining for each transformation rule a Chi-square value for the distribution of predicted outcomes for structured content records associated with a token produced by the transformation rule, relative to a distribution of predicted outcomes of structured content records without the produced token.

28. The system of claim 19, wherein the rules selection process identifies transformation rules that improve the accuracy of the predictive model by determining for each transformation rule a statistical measure of accuracy of the predictive model for a class of candidate transformation rules, and selecting a class of transformation rules according to the measure of accuracy.

29. The system of claim 19, wherein the rules selection process identifies transformation rules that improve the accuracy of the predictive model by determining for each transformation rule a statistical measure of accuracy of the predictive model for a sequence of candidate transformation rules, and selecting a sequence of transformation rules according to the measure of accuracy.

30. The system of claim 19, wherein the rules selection process identifies transformation rules that improve the accuracy of the predictive model by determining for each transformation rule a statistical measure of accuracy of the predictive model for each candidate transformation rules in a sequence of candidate transformations rules, and selecting a transformation rule from the sequence according to the measure of accuracy.

31. The system of claim 19, wherein the rules selection process identifies transformation rules that improve the accuracy of the predictive model by determining residuals between the predicted outcomes and actual outcomes for the structured content records associated with tokens produced by the candidate transformation rule.

32. The system of claim 19, wherein the transformation rules are selected from the group consisting of:
    tokenization rules;
    stemming rules;
    case folding rules;
    aliasing rules;
    spelling correction rules;
    phrase generation rules;
    feature generalization rules; and
    translation rules.

33. The system of claim 19, wherein the predictive model is a supervised learning algorithm.

34. The system of claim 19, further comprising:
    an indexing process adapted to derive the source tokens for the index from the unstructured text content, and associated each source token with at least one structured content record.

35. The system of claim 34, wherein the indexing process is further adapted to:
    parse the unstructured text content records using an initial set of transformation rules to produce the index of source tokens; and
    subsequent to the selection of transformation rules, re-parse the unstructured text content to produce a revised index of source tokens.

36. A computer program product, for selecting transformation rules for application to unstructured text content in customer accounts, and storing program instructions on a computer readable medium, the instructions causing a processor to perform the operations comprising:
    storing a plurality of customer accounts, each customer account comprising:
        a structure content record of financial and personal information associated with a customer;
        unstructured text content derived from an interaction with the customer; and
        an actual outcome of an event related to the customer;
    providing a set of source tokens from the unstructured text content of the customer accounts, each source token associated with at least one of the structured content records;
    applying candidate transformation rules to a set of source tokens to selectively produce tokens in response to the transformation rules;
    determining for each candidate transformation rule a statistical measure of accuracy of a predictive model for predicting outcomes of events related to the customers based on the actual outcomes of events in the customer accounts associated with the produced tokens; and selecting transformation rules that to improve the measure of accuracy of the predictive model.

37. The computer program product of claim 36, wherein operations performed by the processor further comprise:
associating each token produced by a transformation rule from a source token with structured content records associated with a source token.

38. The computer program product of claim 36, wherein operations performed by the processor for determining for each candidate transformation rule a statistical measure of accuracy further comprise:
determining a number of correct and incorrect predicted outcomes from the structured content records associated with a token produced by the transformation rule.

39. The computer program product of claim 36, wherein operations performed by the processor for determining for each candidate transformation rule a statistical measure of accuracy further comprise:
determining a distribution of correct and incorrect predicted outcomes from the structured content records associated with a token produced by the transformation rule.

40. The computer program product of claim 36, wherein operations performed by the processor for selecting transformation rules further comprise:
selecting transformation rules that maximize the measure of accuracy of the predictive model.

41. The computer program product of claim 36, wherein operations performed by the processor for determining for a candidate transformation rule a statistical measure of accuracy of the predictive model further comprise:
determining a number of correct predicted outcomes from the structured content records associated with a token produced by the transformation rule;
determining a number of correct predicted outcomes from the structured content records not associated with the produced token;
determining a number of incorrect predicted outcomes from the structured content records associated with a token produced by the transformation rule; and
determining a number of incorrect predicted outcomes from the structured content records not associated with the produced token.

42. The computer program product of claim 36, wherein operations performed by the processor for determining for each candidate transformation rule a statistical measure of accuracy of the predictive model further comprise:
determining an information gain resulting from transformation rule.

43. The computer program product of claim 36, wherein operations performed by the processor for determining for each candidate transformation rule a statistical measure of accuracy of the predictive model further comprise:
determining an Odds ratio for correct predicted outcomes in structured content records associated with a token produced by the transformation rule.

44. The computer program product of claim 36, wherein operations performed by the processor for determining for each candidate transformation rule a statistical measure of accuracy of the predictive model further comprise:
determining a Chi-square value for the distribution of predicted outcomes for structured content records associated with a token produced by the transformation rule, relative to a distribution of predicted outcomes of structured content records without the produced token.

45. The computer program product of claim 36, wherein operations performed by the processor further comprise:
determining a statistical measure of accuracy of the predictive model for a class of candidate transformation rules; and
selecting a class of transformation rules according to the measure of accuracy.

46. The computer program product of claim 36, wherein operations performed by the processor further comprise:
determining a statistical measure of accuracy of the predictive model for a sequence of candidate transformation rules; and
selecting a sequence of transformation rules according to the measure of accuracy.

47. The computer program product of claim 36, wherein operations performed by the processor further comprise:
determining a statistical measure of accuracy of the predictive model for each candidate transformation rules in a sequence of candidate transformations rules; and
selecting a transformation rule from the sequence according to the measure of accuracy.

48. The computer program product of claim 36, wherein operations performed by the processor for determining for each candidate transformation rule a statistical measure of accuracy of the predictive model further comprise:
determining residuals between the predicted outcomes and actual outcomes for the structured content records associated with tokens produced by the candidate transformation rule.

49. The computer program product of claim 36, wherein the transformation rules are selected from the group consisting of:
tokenization rules;
stemming rules;
case folding rules;
aliasing rules;
spelling correction rules;
phrase generation rules;
feature generalization rules; and
translation rules.

50. The computer program product of claim 36, wherein the predictive model is a supervised learning algorithm.

51. The computer program product of claim 36, wherein operations performed by the processor for providing a set of source tokens from the unstructured text content of the customer accounts further comprise:
parsing the unstructured text content using an initial set of transformation rules to produce the set of source tokens; and
subsequent to the selection of transformation rules, reparsing the unstructured text content to produce a revised set of source tokens.

52. The computer program product of claim 36, wherein operations performed by the processor for applying candidate transformation rules to a set of source tokens to selectively produce tokens in response to the transformation rules, further comprise:
applying a candidate transformation rule to a source token to produce a token;
associating the produced token with the source token;
associating the produced token with the structured content records associated with the source token.

* * * * *